2 Sheets—Sheet 1.
C. R. PEDDLE.
PNEUMATIC CAR BRAKES.
No. 7,283. Reissued Aug. 29, 1876.
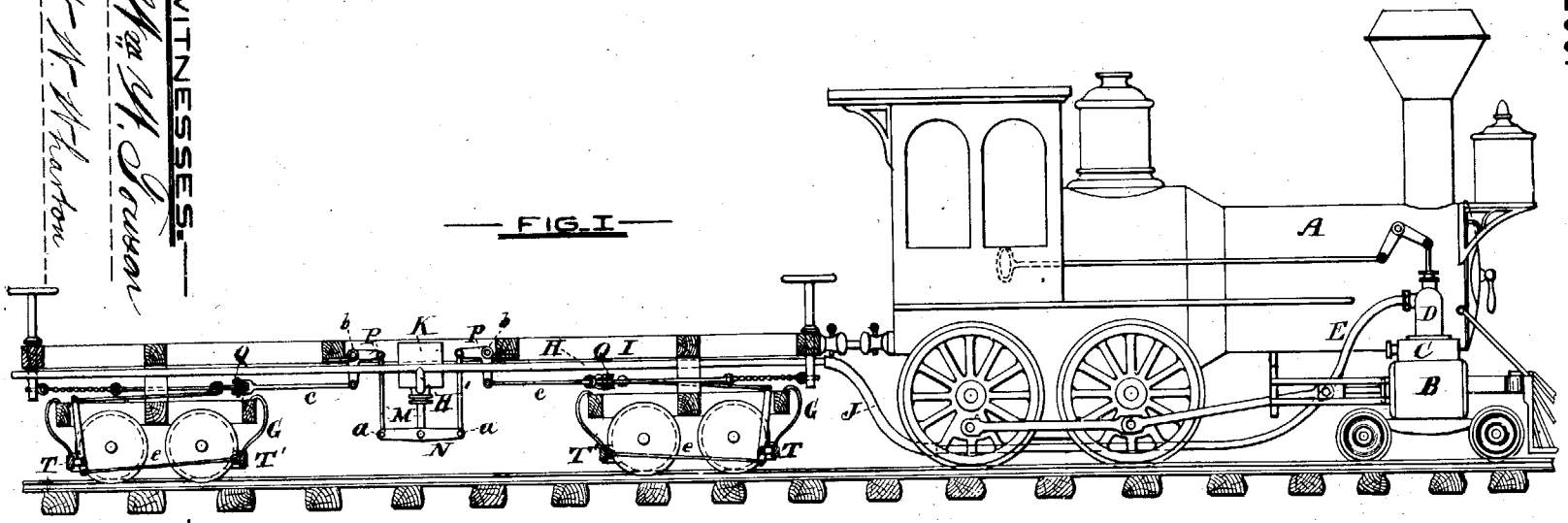
FIG. I
WITNESSES.
Wm. H. Towson
W. W. Wharton
INVENTOR.
Charles R. Peddle,
by W. W. J. Howard,
Attys.

C. R. PEDDLE.
PNEUMATIC CAR BRAKES.
No. 7,283. Reissued Aug. 29, 1876.
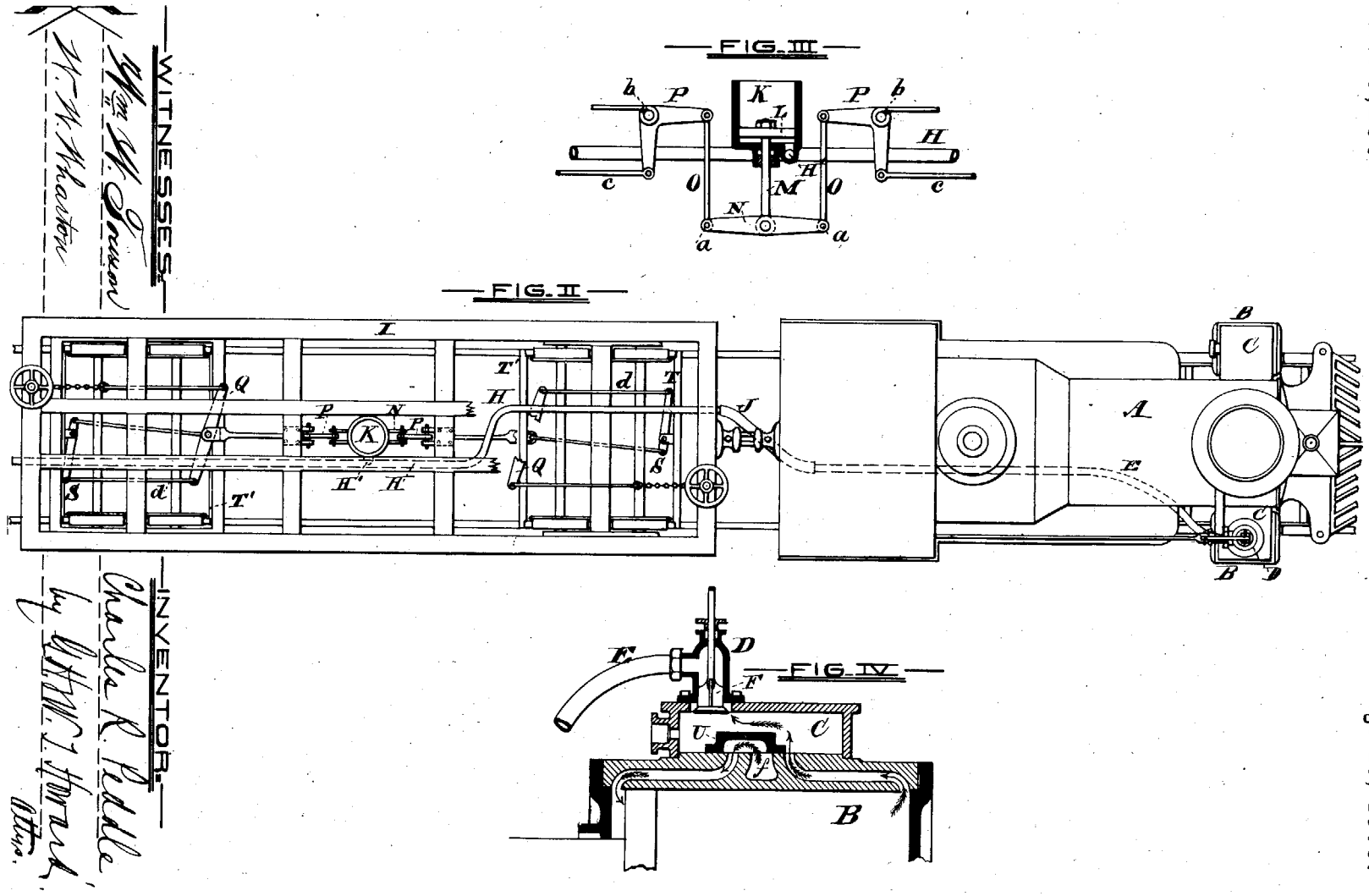
WITNESSES.
Wm. W. Tousson
W. W. Wharton
INVENTOR.
Charles R. Peddle,
by G. H. W. T. Howard,
Attys.

UNITED STATES PATENT OFFICE.

CHARLES R. PEDDLE, OF TERRE HAUTE, INDIANA, ASSIGNOR TO WILLIAM LOUGHRIDGE, OF BALTIMORE COUNTY, MARYLAND.

IMPROVEMENT IN PNEUMATIC CAR-BRAKES.

Specification forming part of Letters Patent No. 61,860, dated February 5, 1867; reissue No. 7,283, dated August 29, 1876; application filed July 19, 1876.

*To all whom it may concern:*

Be it known that I, CHARLES R. PEDDLE, of Terre Haute, in the county of Vigo and State of Indiana, have invented certain new and useful Improvements in Pneumatic Brakes for Railroad-Cars, of which the following is a specification; and I do hereby declare that in the same is contained a full, clear, and exact description of my said invention, reference being had to the accompanying drawing and to the letters of reference marked thereon.

This invention relates, first, to means whereby air, compressed in or by the cylinders of the locomotive after steam is shut off, and required changes are made in the position of certain valves, is caused to act upon the brakes through the medium of air-cylinders, their pistons, and the mechanism connecting the same indirectly with the brake-shoes of the ordinary hand-brake; secondly, this invention relates to the construction and arrangement of the pipes or conduits employed as means of continuous communication between the various parts containing compressed air, whereby the interchanging or turning of the cars is allowed without disturbing the relative positions of the connecting portions of the pneumatic mechanism, and whereby also the flexible pipe-connection between the cars is made clear of the hand-brake mechanism and of the brakemen when coupling the cars.

In the further description of my invention which follows due reference must be had to the accompanying drawing, forming a part of this specification, and in which—

Figure 1 is a side view of a locomotive and a longitudinal section of a car having my improvements attached thereto. Fig. 2 is a plan of the same; and Figs. 3 and 4 are sectional views of portions of the invention, and parts adjacent thereto, on an enlarged scale.

Similar letters of reference indicate similar parts in all the figures.

A represents the locomotive, B and C showing, respectively, the cylinders and steam-chests thereof. D is a valve-case secured to the top of one of the steam-chests, and to which valve-case the pipe E is attached. F is a valve adapted to be elevated or depressed within the case D to open or close the communicating passage existing between the said case and pipe E and the said steam-chest of the locomotive. G G are the trucks of a car attached to the locomotive A by means of a coupling. A pipe, H, is secured to the under side of the car-body I, extending longitudinally thereof. The pipe H is bent in such manner as to bring its ends at opposite sides of the longitudinal center-line of the car; consequently, in coupling cars, the ends of the pipes H always bear the same relation to each other—that is to say, they approach at opposite sides of the said longitudinal center-line.

By the arrangement of the pipes H, as described, the flexible pipe or tube J, which is used to connect them between the cars, passes under the car-coupling, and does not interfere with the hand-brake mechanism or with the passage of the brakemen to either side of the coupling. It also lessens the wear on the flexible tube, as the folding or duplicating motion caused by the alternate closing and distending of the spaces between the cars is much less in a tube connected as shown than in one extending in a line parallel with the line of movement of the car.

K is a cylinder fastened in a vertical position at or near to the center of the body I of the car, and fitted with a piston, L, having a rod, M, extending downward therefrom to a lever, N, the pin forming the connection being the pivot upon which the said lever vibrates to equalize the strain upon the various connections. The pipe H is connected at H′ with the cylinder K. To either end of the lever N is attached, by means of pins *a*, the rods O, the upper ends of which are loosely attached to bell-cranks or levers P, having their fulcra *b* on the bottom of the car. The opposite ends of the bell-cranks are connected by rods *c* to levers Q. The levers Q are at one end thereof attached to the ordinary hand-brake chains, and at the other connected by means of rods *d* to brake-levers S, communicating with the outer brake-beams T. The inner brake-beams T′ are operated through the medium of rods *e* from the lower ends of the levers S.

By referring to the drawing it will be seen that the mechanism employed in the transmission of motion from the piston L to the brake-rods *c* is of such character as will cause an equal strain to be placed upon wheels located at either side of the cylinder K. All the cars of a train are supplied with complete brake mechanism, the connections between the cars being the flexible pipes or tubes J.

The train being in motion, and it is desired to stop, the operation is as follows: The engineer shuts off the steam from the steam-cylinder, opens the valve F in the valve-case D, and reverses the motion of the slide-valve U in the steam-chest C. By this means air is drawn into the steam-cylinder B, through the exhaust-passage *f*, and forced, after the exhaust-passage is closed, through the steam-passage and steam chest to the valve-case D, and thence through the pipes E, J, and H to the air-cylinder K. The air is thus compressed, and serves to operate the brake-shoes through the medium of the mechanism before described.

It will be understood that the operation of this brake depends upon the momentum of the train, the compression of the air ceasing when the wheels of the locomotive are stopped; and that not only does the compressed air operate indirectly upon the brake-shoes to stop the train, but it also places a certain resistance upon the driving wheels of the locomotive by back pressure on the piston.

Having thus described my invention, what I claim as new, and wish to secure by Letters Patent of the United States, is—

1. The combination of the steam-pipes and steam chests of a locomotive with air-pipes E H, extending the whole length of a train of cars, the valve F in the steam-chest, and the air-cylinders K, provided with pistons L, connected with the brake mechanism of the cars, to operate in the manner substantially as and for the purpose set forth.

2. In combination with the rods *c*, attached directly to the brake-levers Q, the levers P, adapted to be actuated in the braking operation by means of the reciprocating lever N and connecting-rods O, substantially as shown.

3. The levers P, adapted to vibrate at opposite sides of the air-cylinder K, and constructed to form, in connection with the rods O and cross-head or lever N, the connection between the brake-rods *c*, substantially as and for the purpose set forth.

4. The air-cylinder K, having the piston L and piston-rod M, in combination with the cross-head or lever N, whereby the force operating upon the said piston is distributed by intervening mechanism to the wheels of separate trucks, or wheels on the opposite sides of the said piston and cylinder, substantially as shown.

5. The intermediate levers P, having their fulcra at *b b*, on opposite sides of the air-cylinder K, in combination with rods *c* and levers Q, substantially as set forth.

6. In a continuous pneumatic car-brake, the air-pipe H, bent so as to bring the ends thereof on opposite sides of the longitudinal center line of the car, substantially as and for the purpose described.

7. In a continuous pneumatic car-brake, an air pipe or duct, the ends of which are on opposite sides of the longitudinal center line of the car, in combination with a flexible tube or pipe crossing the said longitudinal center line of the car, and connecting one end of the said pipe or duct with one end of a similar pipe or duct on an adjoining car or locomotive, substantially as and for the purpose set forth.

In testimony whereof I have hereunto subscribed my name this 12th day of July, in the year of our Lord 1876.

CHAS. R. PEDDLE.

Witnesses:
WM. EGGLESTON,
ADAM TRESSEL.